US008850116B2

(12) United States Patent
Spry

(10) Patent No.: US 8,850,116 B2
(45) Date of Patent: Sep. 30, 2014

(54) DATA PREFETCH FOR SCSI REFERRALS

(75) Inventor: Andrew J. Spry, Wichita, KS (US)

(73) Assignee: LSI Corporation, San Jose, CA (US)

( * ) Notice: Subject to any disclaimer, the term of this patent is extended or adjusted under 35 U.S.C. 154(b) by 522 days.

(21) Appl. No.: 12/721,143

(22) Filed: Mar. 10, 2010

(65) Prior Publication Data

US 2011/0225371 A1 Sep. 15, 2011

(51) Int. Cl.
*G06F 12/00* (2006.01)
*G06F 12/08* (2006.01)

(52) U.S. Cl.
CPC .... *G06F 12/0862* (2013.01); *G06F 2212/6028* (2013.01)
USPC .......................................... 711/118; 711/137

(58) Field of Classification Search
None
See application file for complete search history.

(56) References Cited

U.S. PATENT DOCUMENTS

2002/0091751 A1* 7/2002 Sonoda et al. ................ 709/201
2002/0194429 A1* 12/2002 Chiu et al. ..................... 711/118
2005/0065962 A1* 3/2005 Rowan et al. ................. 707/102
2006/0031635 A1* 2/2006 Zohar et al. ................... 711/113
2009/0112877 A1* 4/2009 Cherian et al. ................. 707/10

* cited by examiner

*Primary Examiner* — Matthew Bradley
*Assistant Examiner* — Daniel Tsui
(74) *Attorney, Agent, or Firm* — Suiter Swantz pc llo

(57) ABSTRACT

A method for communication between an initiator system and a storage cluster. The method comprises receiving an initial I/O request from the initiator system to a first storage system; providing a referral response from the first storage system to the initiator system, the referral response providing information for directing the initiator system to a second storage system; notifying the second storage system regarding the referral response via a prefetch notice, the prefetch notice including an operation type and address information for accessing requested data; when the initial I/O request is a read request, prefetching at least a portion of the requested data stored in the second storage system in to a cache; receiving a second I/O request from the initiator system to the second storage system; and providing to the initiator system the portion of the prefetched data from the cache of the second storage system.

20 Claims, 4 Drawing Sheets

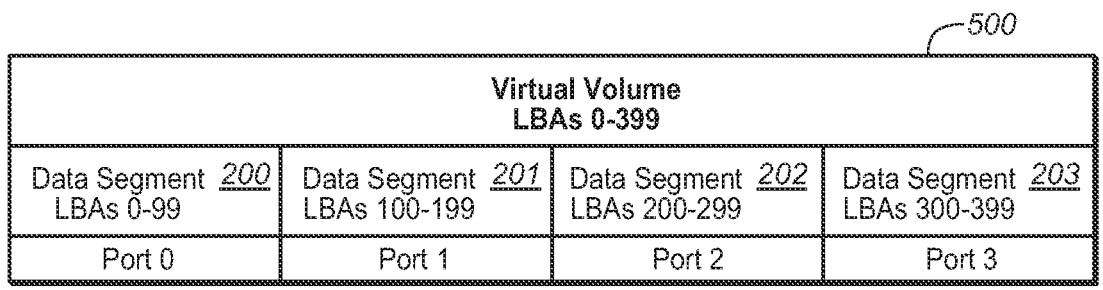
*FIG. 2*
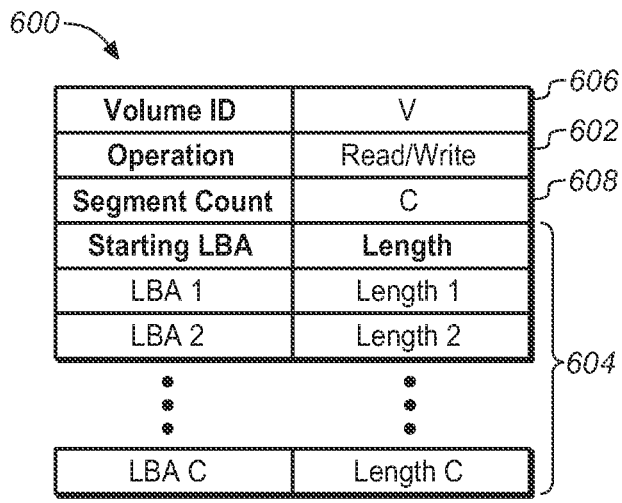
*FIG. 3*
*FIG. 4*

DATA PREFETCH FOR SCSI REFERRALS

CROSS-REFERENCE TO RELATED APPLICATIONS

U.S. patent application Ser. No. 12/316,713 entitled: Small Computer System Interface Input Output (SCSI IO) Referral, filed Dec. 15, 2008 (pending) is hereby incorporated by reference in its entirety herein. U.S. patent application Ser. No. 12/384,001 entitled: Method and System for Implementing Parallelism with SCSI I/O Referrals, filed Mar. 31, 2009 (pending) is hereby incorporated by reference in its entirety herein.

FIELD OF THE INVENTION

The present invention relates to the field of electronic data storage and particularly to a system and method for providing prefetching/pre-allocation for Small Computer System Interface (SCSI) referrals.

BACKGROUND OF THE INVENTION

Small Computer System Interface (SCSI) Input/Output (I/O) referral techniques may be utilized to facilitate communication between an initiator system and a block storage cluster. For example, the initiator system (e.g., a data requester) may transmit a data request command to a first storage system of the block storage cluster. If the data requested is stored in the first storage system, the data may be retrieved and transferred to the initiator system. However, if a portion of the data requested is not stored by the first storage system, but is stored by a second storage system of the block storage cluster, a referral response may be transmitted from the first storage system to the initiator system. The referral response may provide an indication to the initiator system that not all of the requested data was transferred. The referral response may further provide information for directing the initiator system to the second storage system.

SUMMARY OF THE INVENTION

Accordingly, an embodiment of the present disclosure is directed to a method for communication between an initiator system and a storage cluster. The method may comprise receiving an initial input/output (I/O) request from the initiator system to a first storage system of the storage cluster; providing a referral response from the first storage system to the initiator system, the referral response providing information for directing the initiator system to a second storage system of the storage cluster; notifying the second storage system regarding the referral response via a prefetch notice, the prefetch notice including: an operation type of the initial I/O request; and address information for accessing requested data stored in the second storage system; when the initial I/O request is a read request, prefetching at least a portion of the requested data stored in the second storage system in to a cache of the second storage system, the data being prefetched being determined based on the address information specified in the prefetch notice; receiving a second I/O request from the initiator system to the second storage system; and when the second I/O request is a read request directed to the second storage system based on the referral response, providing to the initiator system the portion of the prefetched data from the cache of the second storage system.

A further embodiment of the present disclosure is directed to the method for communication between the initiator system and the storage cluster as described above. The method may further comprise when the initial I/O request is a write operation, pre-allocating at least a portion of the cache of the second storage system, the cache being pre-allocated being determined based on the address information specified in the prefetch notice; and when the second I/O request is a write operation directed to the second storage system based on the referral response, utilizing the pre-allocated portion of the cache to buffer data received from the second I/O request.

An additional embodiment of the present disclosure is directed to a computer-readable medium having computer-executable instructions for performing a method for communication between an initiator system and a storage cluster. The method may comprise receiving an initial input/output (I/O) request from the initiator system to a first storage system of the storage cluster; providing a referral response from the first storage system to the initiator system, the referral response providing information for directing the initiator system to a second storage system of the storage cluster; notifying the second storage system regarding the referral response via a prefetch notice, the prefetch notice including: an operation type of the initial I/O request; and address information for accessing requested data stored in the second storage system; when the initial I/O request is a read request, prefetching at least a portion of the requested data stored in the second storage system in to a cache of the second storage system, the data being prefetched being determined based on the address information specified in the prefetch notice; receiving a second I/O request from the initiator system to the second storage system; and when the second I/O request is a read request directed to the second storage system based on the referral response, providing to the initiator system the portion of the prefetched data from the cache of the second storage system.

A further embodiment of the present disclosure is directed to the computer-readable medium having computer-executable instructions for performing the method as described above. The method may further comprise when the initial I/O request is a write operation, pre-allocating at least a portion of the cache of the second storage system, the cache being pre-allocated being determined based on the address information specified in the prefetch notice; and when the second I/O request is a write operation directed to the second storage system based on the referral response, utilizing the pre-allocated portion of the cache to buffer data received from the second I/O request.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 2 is an illustration of a virtual volume map;
FIG. 3 is an illustration of a referral response;
FIG. 4 is an illustration of a prefetch notice.

DETAILED DESCRIPTION OF THE INVENTION

Reference will now be made in detail to the presently preferred embodiments of the invention, examples of which are illustrated in the accompanying drawings.

Figure 1:
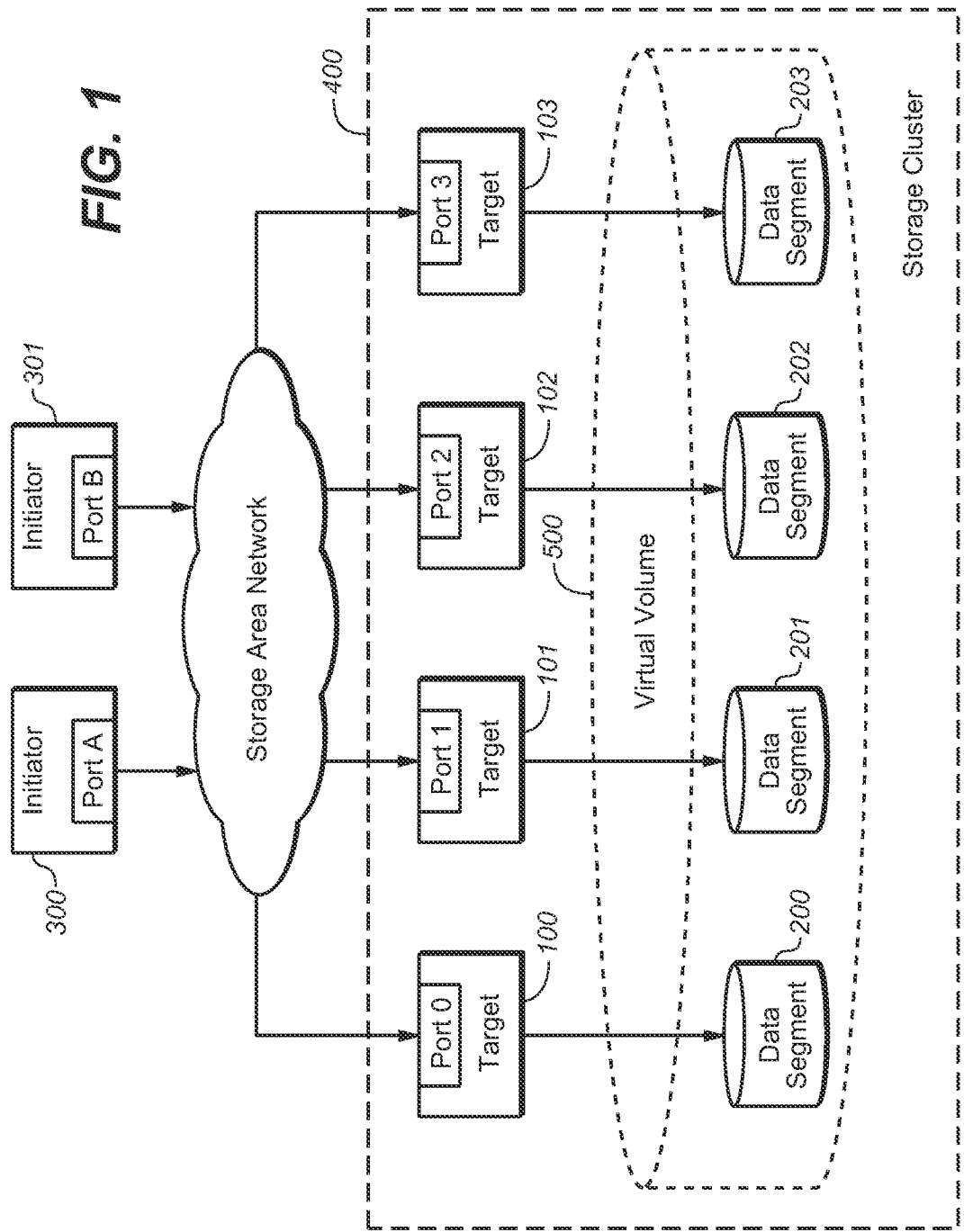
FIG. 1 is a networked storage implementation/system accessible via a block storage protocol.

Referring to FIG. 1, a networked storage implementation/system accessible via a block storage protocol in accordance with an exemplary embodiment of the present disclosure is shown. Initiator systems 300 and 301 may be configured for accessing a block storage cluster 400 via a storage area network.

Small Computer System Interface (SCSI) Input/Output (I/O) referral techniques may be utilized to facilitate communication between an initiator system 300 and a block storage cluster 400. SCSI I/O referral techniques may enable an initiator system to access data on Logical Unit Numbers (LUNs) that are spread across a plurality of storage/target devices. These target devices may be disks, storage arrays, tape libraries, and/or other types of storage devices. It is understood that an I/O request may be a SCSI command, the first storage system may be a SCSI storage system, and the initiator system may be a SCSI initiator system. The SCSI command may identify the requested data by a starting address of the data and a length of the data in a volume logical block address space.

Utilizing SCSI referrals, initiators 300 and 301 may access any data using any port in the storage cluster 400. If any of the requested data is not resident on the storage target at a particular cluster port, the storage target may return a referral response with a description of where data is located in the cluster. The initiator may then make one or more referral I/O requests (generated based on the referral response) to retrieve data from the ports specified in the referral response.

In one embodiment, all storage targets that contribute data segments to a virtual volume 500 (targets 100 through 103 in the example illustrated in FIGS. 1 through 3) may have access to a virtual volume map. An exemplary the virtual volume map is illustrated in FIG. 2. Utilizing the virtual volume map, when the initiator 300 makes a request to port 1 of target 101 to read 200 blocks of data from volume 500 starting at LBA 50, target 101 may be able to determine that some of the data requested by the initiator 300 is not stored on its local cluster node (data segment 201 for target 101). Therefore, instead of returning data to the initiator, target 101 may generate a referral response to the initiator 300.

An exemplary SCSI referral response is illustrated in FIG. 3. The referral response informs the initiator 300 that the data requested (to read 200 blocks of data from virtual volume 500 starting at LBA 50) is distributed across three cluster nodes, and more specifically: there is 50 blocks of data starting at LBA 50 resident on target 100 accessible through port 0; there is 100 blocks of data starting at LBA 100 resident on target 101 accessible through port 1; and there is 50 blocks of data starting at LBA 200 resident on target 102 accessible through port 2. Based on the referral responses, the initiator 300 may generate three referral I/O requests and send the referral I/O requests to ports 0, 1, and 2 of the storage cluster to read 200 blocks of data from virtual volume 500 starting at LBA 50.

The method of the present disclosure may reduce the latency of SCSI referrals by prefetching data or preallocating buffers for the impending referral I/O requests. The target that received the initial I/O request (target 101 in the above example) is aware of which section of the I/O request is resident in its local storage devices. For a read I/O request, data may be read from its local storage devices and held in a data cache until the referral I/O arrives. For a write I/O request, data buffers may be pre-allocated so data may be received from the initiator immediately upon the arrival of the referral I/O request. However, other targets/nodes in the storage cluster (e.g., target 100, 102 and 103) are unaware of the impending referral I/O request. To prepare them for the referral I/O requests, the storage target that received the original I/O request may generate and send prefetch notices to all targets that will receive referral I/O requests from the initiator.

FIG. 4 shows the format of a prefetch notice 600. The prefetch notice 600 includes an operation type 602 of the original I/O request (a read or write operation) and address information 604 for specifying the data segments to be prefetched or preallocated. In one embodiment, each data segment is identified by its starting logical block address (LBA) and data length. A segment count 608 may be specified in the prefetch notice 600 to indicate how many segments are to be prefetched or preallocated. Furthermore, if the storage cluster includes multiple volumes, a cluster wide unique volume identifier 606 may be included in the prefetch notice 600 for identifying the volume on which the impending referral I/O request is directed.

The prefetch notices may be generated based on information available in the original I/O request and the referral response. For instance, the volume identifier 606 and the operation type 602 may be determined based on the original I/O request. The address information 604 (the list of data segments) may be generated based on the information available from the referral response. For example, the starting LBA and length information for each port in the referral response (as illustrated in FIG. 3) may correspond to a data segment in the prefetch notice. The number of data segments on each storage cluster port may be determined for the segment count 608.

Figure 5:
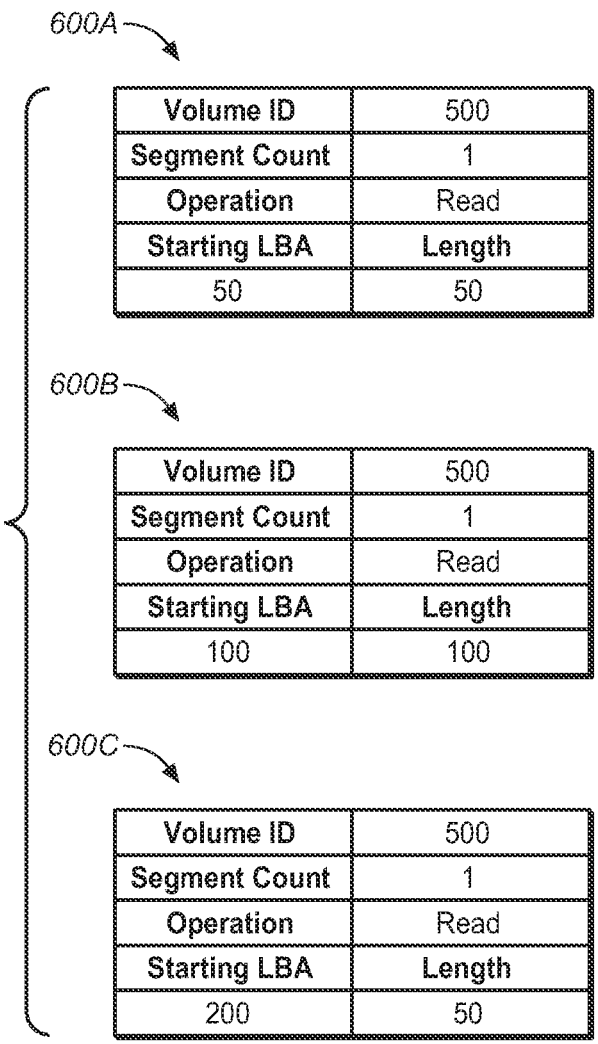
FIG. 5 is an illustration of three prefetch notices.

In one embodiment, a prefetch notice 600 is generated for each target port which will receive an impending referral I/O request. Therefore, three prefetch notices are generated in the above example for reading 200 blocks of data from volume 500 starting at LBA 50. FIG. 5 shows the three prefetch notices 600A, 600B and 600C. These prefetch notices may be generated by the target that received the original I/O request (i.e., target 101), and sent to the targets that corresponds to port 0, port 1, and port 2 (the ports that are referenced in the referral response). In this example, prefetch notice 600A is sent to target 100 (corresponding to port 0), prefetch notice 600B is consumed locally by target 101 (corresponding to port 1), and prefetch notice 600C is sent to target 102 (corresponding to port 2). It is contemplated that the mappings between the targets and the corresponding ports may be determined utilizing the referral response (as illustrated in FIG. 3); alternatively, the mappings may be determined based on the virtual volume map and the starting LBA (e.g., the virtual volume map of FIG. 2 indicates that the corresponding port for LBAs 200-299 is port 2).

It is understood that the prefetch notices may be sent over any communication channel between the storage targets/nodes. Upon receiving the prefetch notice, a storage target may process the notice in order to prefetch and/or pre-allocate the data cache of this particular storage target. It is understood that prefetch and/or pre-allocate operations may be performed by the storage targets/nodes whether the prefetch notice was generated locally (e.g., target 101 in the above example) or received from another target in the cluster (e.g., target 100 and 102 in the above example). It is also understood that if the storage target that received the original I/O request does not have any part of the requested data stored in its local storage devices, then this storage target may not need to generate a local prefetch notice for itself.

Upon receiving the prefetch notice, each storage target may start preparing its data cache for the impending referral I/O request. For example, if the prefetch notice indicates a read request, at least a portion of the requested data stored in this particular storage target may be prefetched in to the data cache. In this manner, the impending referral I/O request directed to this storage target may be able to retrieve at least the portion of the requested data directly from the data cache, therefore, reducing the latency of the read request I/O referrals.

In another example, if the prefetch notice indicates a write request, this particular storage target may pre-allocate at least a portion of the data cache in preparation of receiving data from the impending referral I/O request directed to this storage target. In this manner, the referral I/O request directed to this storage target may be able to utilize the pre-allocated cache immediately to perform the write operation, therefore, reducing the latency of the write request I/O referrals.

Figure 6:
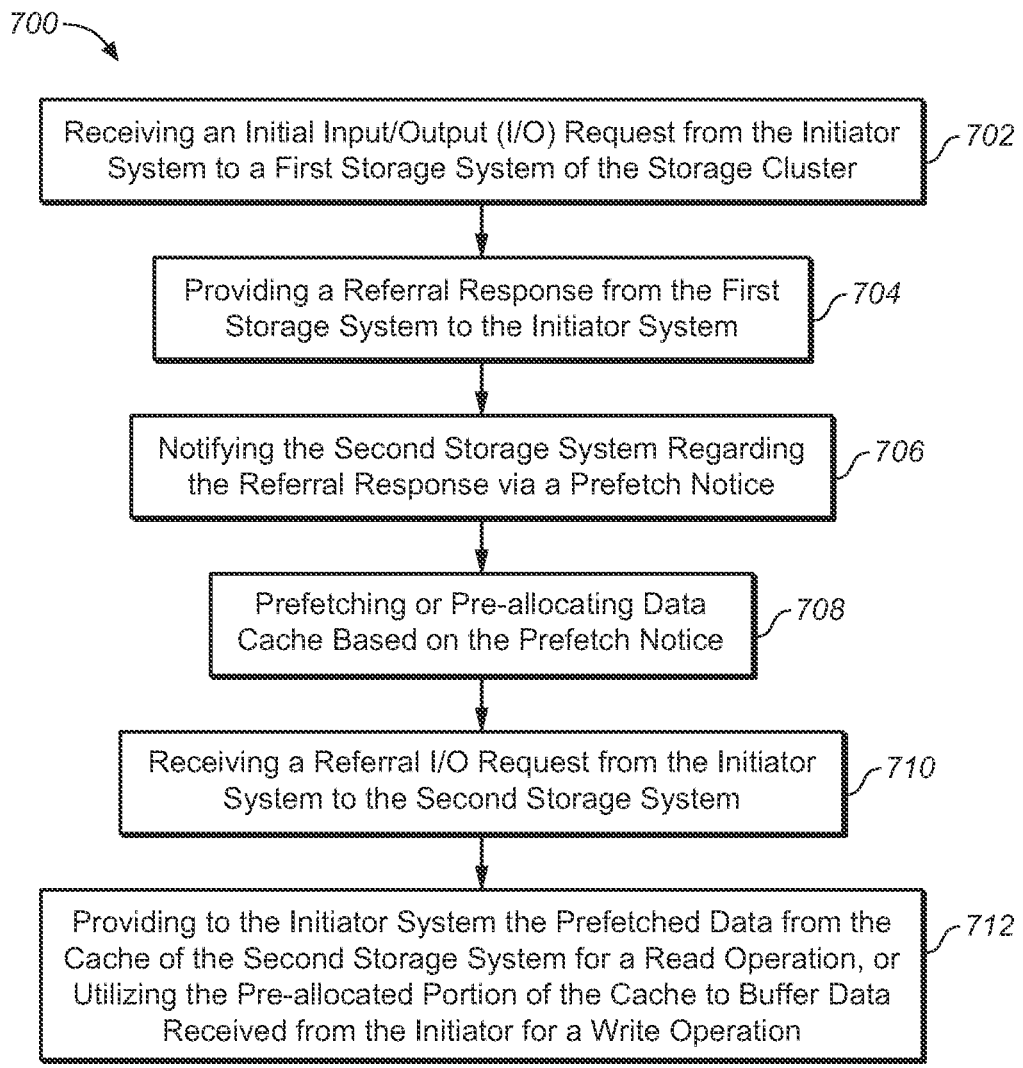
FIG. 6 is a flow chart illustrating a method for communication between an initiator system and a storage cluster of the present disclosure.

FIG. 6 shows a flow diagram illustrating steps performed by a communication method 700 in accordance with the present disclosure. A storage target receives an initial I/O request from an initiator in step 702. If all of the data requested is resident on the storage target receiving the initial I/O request, data may be transferred to or from the storage target and a SCSI response may be sent to the initiator to complete the I/O request. However, if the data requested is resident on more than one storage target, a SCSI referral response/list is created in step 704 and returned to the initiator. In one embodiment, no data is transferred before the SCSI referral response is returned to the initiator.

Each of the storage targets that stores a portion of the requested data may be notified in step 706. In one embodiment, the storage targets are notified via prefetch notices. Each prefetch notice includes an operation type of the initial I/O request and address information for accessing the corresponding portion of the requested data. Upon receiving the prefetch notice, each storage target may prepare its data cache in step 708 based on the prefetch notice received. For example, if the prefetch notice indicates a read request, at least a portion of the requested data stored in this particular storage target may be prefetched in to the data cache. In another example, if the prefetch notice indicates a write request, this particular storage target may pre-allocate at least a portion of the data cache in preparation of receiving data from a subsequent referral I/O request directed to this storage target.

The referral I/O requests generated by the initiator may be received in step 710. Each referral I/O request is received on a port specified in the referral list returned by the storage target that received the original I/O request. Utilizing the prefetch/pre-allocate method of the present disclosure, the data requested by the referral I/O request is already available for read or write because the prefetch notice was processed before the arrival of the referral I/O requests. In this manner, as illustrated in step 712, a referral read request may be able to retrieve the requested data directly from the data cache, and similarly, a referral write request may be able to utilize the pre-allocated cache to perform the write operation.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for communication between an initiator system and a storage cluster, comprising:

receiving an initial input/output (I/O) request from the initiator system to a first storage system of the storage cluster;

providing only a referral response from the first storage system to the initiator system without providing any data in response to the initial I/O request regardless of whether any portion of the data is stored in the first storage system when at least a portion of the data is not stored in the first storage system, the referral response providing information for directing the initiator system to each particular storage system of the storage cluster that stores at least a portion of the requested data;

notifying each particular storage system that stores at least a portion of the requested data regarding the referral response via a prefetch notice, the prefetch notice including: an operation type of the initial I/O request; and address information for accessing requested data stored in each particular storage system_that stores at least a portion of the requested data;

when the initial I/O request is a read request, prefetching at least a portion of the requested data stored in each particular storage system in to a cache of that particular storage system, the data being prefetched being determined based on the address information specified in the prefetch notice;

when the initial I/O request is a write operation, pre-allocating at least a portion of the cache of each particular storage system that stores at least a portion of the requested data in response to receiving the prefetch notice at that particular storage system, the cache being pre-allocated being determined based on the address information specified in the prefetch notice;
receiving a subsequent I/O request from the initiator system to each particular storage system that stores at least a portion of the requested data; and
for each particular storage system that stores at least a portion of the requested data:
when the subsequent I/O request is a read request directed to that particular storage system based on the referral response, providing to the initiator system the portion of the prefetched data from the cache of that particular storage system; and
when the subsequent I/O request is a write operation directed to that particular storage system based on the referral response, utilizing the pre-allocated portion of the cache to buffer data received from the subsequent I/O request.

2. The method as claimed in claim 1, wherein the address information comprises:
a starting logical block address (LBA); and
a data length for specifying a number of blocks requested starting from the starting LBA.

3. The method as claimed in claim 1, wherein the prefetch notice further comprises:
a volume identifier, the volume identifier being configured to uniquely identify a storage volume of the storage cluster.

4. The method as claimed in claim 1, wherein the prefetch notice further comprises:
a segment count, the segment count being configured to specify a total number of segments specified in the prefetch notice.

5. The method as claimed in claim 1, wherein the I/O request is a Small Computer System interface (SCSI) command, the first storage system is a SCSI storage system, and the initiator system is a SCSI initiator system.

6. The method as claimed in claim 5, wherein the SCSI command identifies the requested data by a starting address of the data and a length of the data in a volume logical block address space.

7. A method for communication between an initiator system and a storage cluster, comprising:
receiving an initial input/output (I/O) request from the initiator system to a first storage system of the storage cluster;
providing only a referral response from the first storage system to the initiator system without performing any data processing in response to the initial I/O request regardless of whether any portion of the data is stored in the first storage system when at least a portion of the data is not stored in the first storage system, the referral response providing information for directing the initiator system to a plurality of storage systems of the storage cluster;
notifying each of the plurality of storage systems regarding the referral response via a prefetch notice, each prefetch notice including: an operation type of the initial I/O request; and address information for accessing requested data stored in each corresponding storage system;
when the initial I/O request is a write operation, pre-allocating at least a portion of a cache for each of the plurality of storage systems in response to the prefetch notice received, the cache being pre-allocated being determined based on the address information specified in each of the prefetch notices;
receiving a plurality of referral I/O requests from the initiator system, the plurality of referral I/O requests being generated in response to the referral response; and
utilizing the pre-allocated portion of the cache for each of the plurality of storage systems to buffer data received from the initiator system.

8. The method as claimed in claim 7, further comprising:
when the initial I/O request is a read request, prefetching at least a portion of the requested data stored in each of the plurality of storage systems in to the cache, the data being prefetched being determined based on the address information specified in each of the prefetch notices; and
providing to the initiator system the prefetched data from the cache.

9. The method as claimed in claim 7, wherein the address information comprises:
a starting logical block address (LBA); and
a data length for specifying a number of blocks requested starting from the starting LBA.

10. The method as claimed in claim 7, wherein the prefetch notice further comprises:
a volume identifier, the volume identifier being configured to uniquely identify a storage volume of the storage cluster.

11. The method as claimed in claim 7, wherein the prefetch notice further comprises:
a segment count, the segment count being configured to specify a total number of segments specified in the prefetch notice.

12. The method as claimed in claim 7, wherein the I/O request is a Small Computer interface (SCSI) command, the first storage system is a SCSI storage system, and the initiator system is a SCSI initiator system.

13. The method as claimed in claim 12, wherein the SCSI command identifies the requested data by a starting address of the data and a length of the data in a volume logical block address space.

14. A non-transitory computer-readable device having computer-executable instructions for performing a method for communication between an initiator system and a storage cluster, said method comprising:
receiving an initial input/output (I/O) request from the initiator system to a first storage system of the storage cluster;
providing only a referral response from the first storage system to the initiator system without providing any data in response to the initial I/O request regardless of whether any portion of the data is stored in the first storage system when at least a portion of the data is not stored in the first storage system, the referral response providing information for directing the initiator system to each particular storage system of the storage cluster that stores at least a portion of the requested data;
notifying each particular storage system that stores at least a portion of the requested data regarding the referral response via a prefetch notice, the prefetch notice including: an operation type of the initial I/O request; and address information for accessing requested data stored in each particular storage system_that stores at least a portion of the requested data;
when the initial I/O request is a read request, prefetching at least a portion of the requested data stored in the each particular storage system in to a cache of that particular storage system, the data being prefetched being determined based on the address information specified in the prefetch notice; and when the initial I/O request is a write operation, pre-allocating at least a portion of the cache of each particular storage system that stores at least a portion of the requested data in response to receiving the prefetch notice at that particular storage system, the cache being pre-allocated being determined based on the address information specified in the prefetch notice.

15. The non-transitory computer-readable device as claimed in claim 14, wherein said method further comprising:
  receiving a subsequent I/O request from the initiator system to a particular storage system that stores at least a portion of the requested data; and
  for the particular storage system that stores at least a portion of the requested data:
    when the subsequent I/O request is a read request directed to that particular storage system based on the referral response, providing to the initiator system the portion of the prefetched data from the cache of that particular storage system; and
    when the subsequent I/O request is a write operation directed to that particular storage system based on the referral response, utilizing the pre-allocated portion of the cache to buffer data received from the subsequent I/O request.

16. The non-transitory computer-readable device as claimed in claim 14, wherein the address information comprises:
  a starting logical block address (LBA); and
  a data length for specifying a number of blocks requested starting from the starting LBA.

17. The non-transitory computer-readable device as claimed in claim 14, wherein the prefetch notice further comprises:
  a volume identifier, the volume identifier being configured to uniquely identify a storage volume of the storage cluster.

18. The non-transitory computer-readable device as claimed in claim 14, wherein the prefetch notice further comprises:
  a segment count, the segment count being configured to specify a total number of segments specified in the prefetch notice.

19. The non-transitory computer-readable device as claimed in claim 14, wherein the I/O request is a Small Computer System interface (SCSI) command, the first storage system is a SCSI storage system, and the initiator system is a SCSI initiator system.

20. The non-transitory computer-readable device as claimed in claim 19, wherein the SCSI command identifies the requested data by a starting address of the data and a length of the data in a volume logical block address space.

* * * * *